United States Patent [19]

Hanback et al.

[11] 3,730,563
[45] May 1, 1973

[54] LIP SEAL FITTING

[75] Inventors: Francis J. Hanback, Palos Verdes; Norman F. Robinson, Manhattan Beach, both of Calif.

[73] Assignee: McDonnell Douglas Corporation, Santa Monica, Calif.

[22] Filed: Feb. 22, 1971

[21] Appl. No.: 117,656

[52] U.S. Cl. .................... 285/114, 285/110, 285/212
[51] Int. Cl. .............................................. F16l 55/00
[58] Field of Search ...................... 285/110, 219, 220, 285/211, 212, 390, 114, 333, 343, 115; 85/9 R; 151/38

[56] References Cited

UNITED STATES PATENTS

| 2,209,621 | 7/1940 | Carter | 285/219 X |
| 3,145,035 | 8/1964 | Hanback | 285/110 |
| 3,003,795 | 10/1961 | Lyon | 285/212 |
| 3,101,206 | 8/1963 | Franck | 285/220 |

*Primary Examiner*—Thomas F. Callaghan
*Attorney*—Walter J. Jason, Donald L. Royer and George W. Finch

[57] ABSTRACT

A fitting for establishing a sealed connection with a boss, which fitting includes a semi-flexible cantilevered sealing lip about the periphery thereof, an undersized threaded portion which aligns and pulls the sealing lip against a chamfered boss surface when the fitting is tightened thereto and a relieved portion between the threaded portion and the lip to enable predetermined stretching and yielding to protect the boss from over-torquing of the fitting and overpressures which may be applied thereto.

1 Claim, 11 Drawing Figures

PATENTED MAY 1 1973
3,730,563
SHEET 1 OF 2
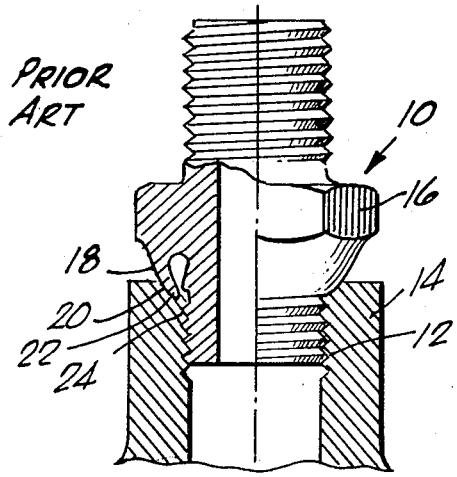
*Fig. 1* PRIOR ART
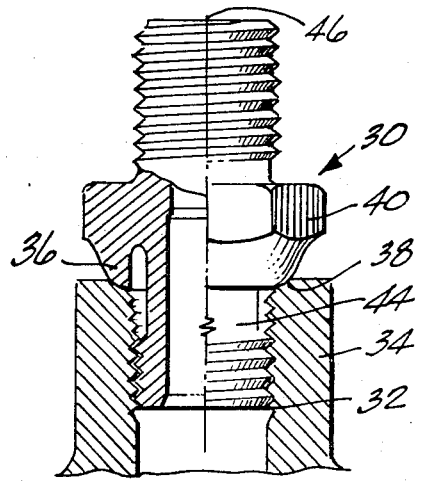
*Fig. 2*
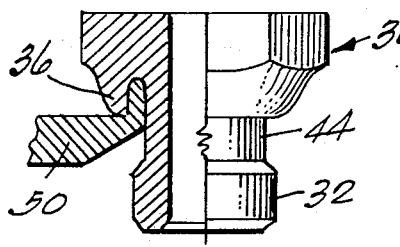
*Fig. 4*
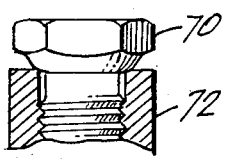
*Fig. 6A*
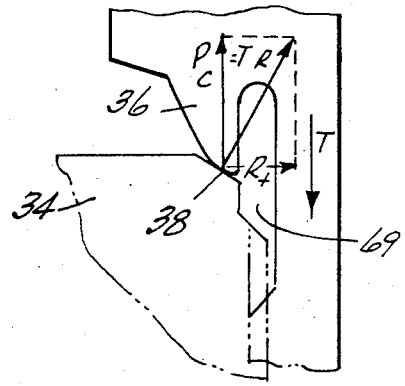
*Fig. 5*
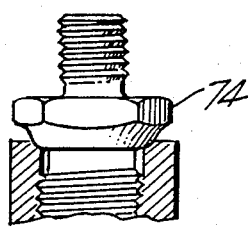
*Fig. 6B*
*Fig. 6E*
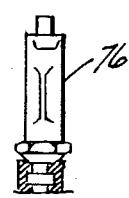
*Fig. 6C*
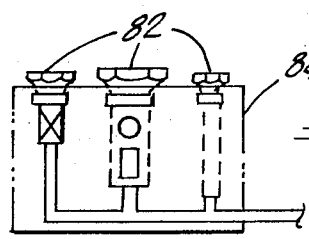
*Fig. 6D*
*Fig. 6F*
INVENTORS
FRANCIS J. HANBACK
NORMAN F. ROBINSON
BY
George W. Finch
-ATTORNEY-

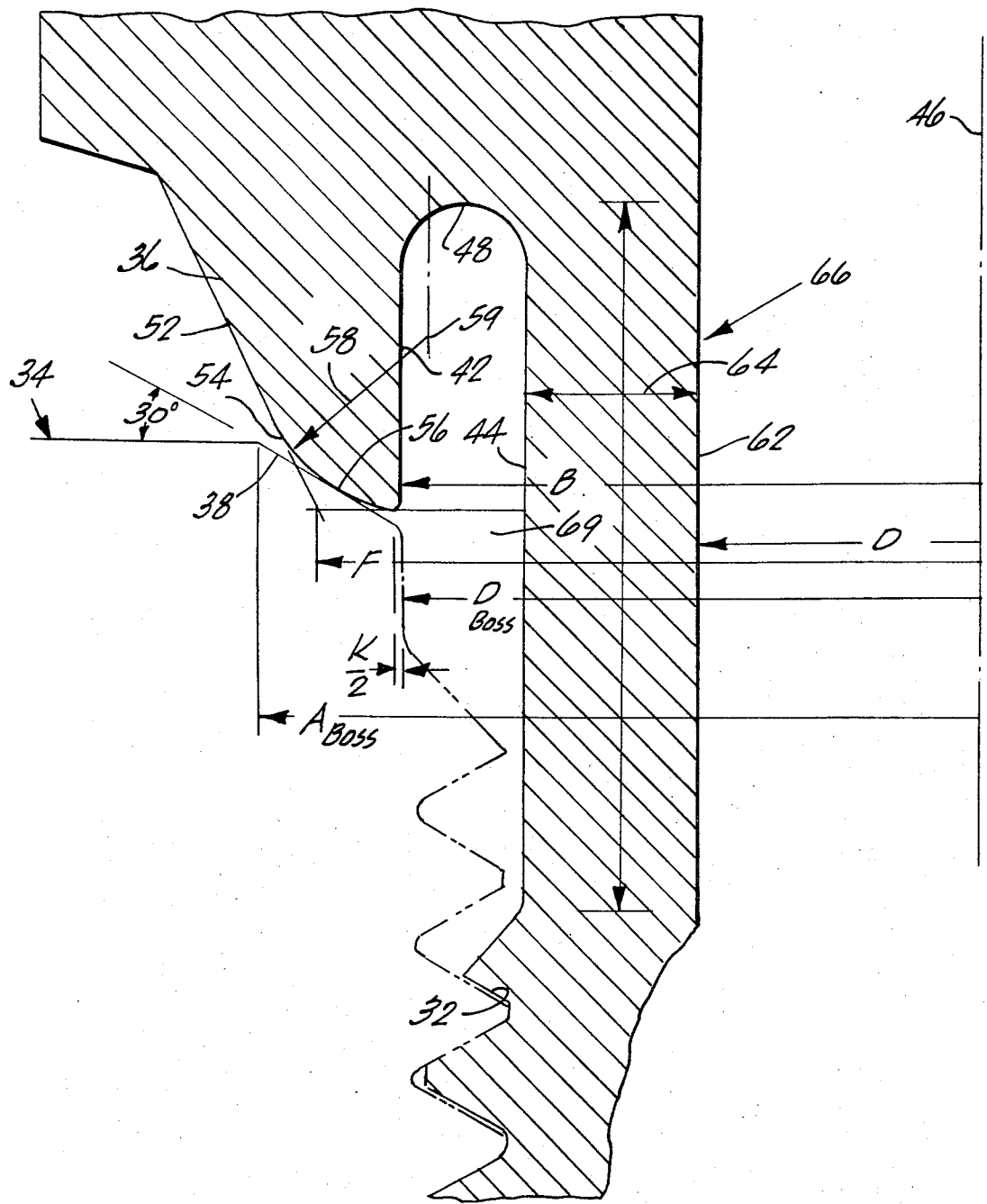

LIP SEAL FITTING

BACKGROUND OF THE INVENTION

Many high cost hydraulic equipment items such as pumps, reservoirs, valves and cylinders have hydraulic fluid ports in the form of bosses each consisting of an internally threaded hole with a chamfered face surface. The bosses are designed to mate with appropriate replaceable fittings, each fitting and boss forming an annular cavity in which a rubber packing ring is installed to form a seal. The rubber packing rings of such devices deteriorate with age and tend to extrude, which along with other problems, destroy the seal and cause the connection to leak.

Male and female lip seal type fittings such as those shown in U. S. Pat. No. 3,145,035 entitled PIPE COUPLING HAVING A FLEXIBLE SEALING LIP, by F. J. Hanback, who is one of the co-inventors of the present fitting, have been designed to eliminate the rubber packing ring. These fittings include a thin inwardly sloping lip of metal or other yieldable fitting material which forms a ring shaped integral part of the fitting. The inwardly sloping lip forms a seal by pressing against the chamfered seat of the boss which deforms to mate with the lip. This prior art lip seal fitting, although eliminating the requirement for a rubber packing ring has, due to its construction, raised other problems which are eliminated by the present invention.

For example, most successful applications of lip seal fittings of this type have required that the boss be constructed of a material which is at least as hard as the material used in constructing the fitting. Unfortunately, design requirements of fluid systems in which such fittings are used, often require that the boss be made of a relatively soft metal such as cast aluminum while the fitting must be made of a harder material such as titanium alloy or steel because of strength considerations. This results in the reverse of the desired situation. It poses the possibility that the more expensive part; that is, the high cost component containing the boss may be damaged by the less expensive fitting if the connection is overtightened. The damage to the boss results because heretofore lips of such fittings have extended down into the boss at a substantial angle and they have included relatively sharp radii on the ends thereof that tend to bite into and damage the soft boss when the fittings are overtightened. Also heretofore, no means have been provided integral with a lip seal fitting to assure that the fitting is adequately tightened into the boss yet which prevent the overtightening thereof.

BRIEF SUMMARY OF THE INVENTION

The present invention improves the prior art lip seal fittings discussed above by providing a fitting which can be constructed from hard materials yet which can be used with soft bosses, and it provides means to prevent overtightening which at the same time assure that the fitting remains in a sealed condition. The fitting includes a threaded portion on one end for connection to the boss, an integral semi-flexible cantilevered lip in the shape of a ring positioned to press against the chamfered boss seat and an elongated thread relief portion therebetween which acts as a torque lock and overtightening preventor. The edge of the sealing lip which contacts the boss has a substantial radius so that it does not bite or otherwise damage the boss which can be made of a substantially softer material, and yet the lip itself is strong enough at the tip to deform minor surface irregularities in the boss material thus assuring a leak-tight seal.

The threaded portion of the fitting usually includes undersized threads which enable the lip to self-center itself as the fitting is tightened into the boss. This self-centering feature accommodates the concentricity allowables in standard boss designs and permits the present fitting to be used with industry standard bosses without requiring costly precision changes or new boss designs. The large radius at the tip of the lip provides an ample sealing contact ring without cutting or galling the countersunk seat in the boss and it localizes deformation of the lip without gouging the boss which may be of a softer material than the lip, as aforesaid.

The stretchable or yieldable elongated thread relief portion of the fitting also procludes fitting rupture under extreme pressure conditions. This is because essentially the thread relief portion is the weakest area of the fitting. Extreme pressure within the fitting causes the thread relief portion to momentarily stretch, thereby allowing the lip to lift off the boss and act like a pressure poppet to relieve the overpressure.

The sealing arrangement of the boss and the fitting is maintained by the tightening torque reacting simultaneously on two deflectable provisions in the fitting namely inward deflection of the cantilevered sealing lip guided by the large tip radius on the slope of the boss countersink and a calculated yielding or stretching of the cross-section of the thread relief portion of the fitting. This combined yielding feature not only provides a wide range of tightening torque necessary to seal a variety of material combinations, it also assures torque lock of the fitting under all environmental conditions without the need of other locking devices such as abutment stops, safety wires, or lock washers.

The design of the present fittings also allows them to be made from high strength materials, such as a titanium alloy, which rapidly work harden. Heretofore, fittings employing sealing lips have required a cold-forming or swaging step in their manufacture which is difficult if not impossible with titanium alloy. The present fitting can be manufactured from titanium bar stock by relatively conventional cutting tools because no swaging or cold-forming step is required. In addition, the elimination of the swaging or cold-forming step has reduced manufacturing costs of softer fittings up to 25 percent.

It is therefore an object of the present invention to provide a lip seal fitting which is adaptable for use in bosses constructed of material which is softer than the material used in the fitting.

Another object is to provide a lip seal fitting which can be economically constructed of materials not easily cold-formed.

Another object is to provide a fitting which can respond to overpressures like a poppet valve to relieve the pressure therein.

Another object is to provide a metal to metal fitting which can be used in bosses of standard tolerance.

Another object is to provide a male or female lip seal fitting which requires no abutment stops to prevent overtightening thereof.

Another object is to provide a male lip seal fitting construction which can be used in unions, plugs, reducers, check valves, filters, restrictors, relief valves, quick disconnects, and modular equipment cartridges, to name a few.

Another object is to provide a lip seal fitting which provides sufficient space to ingest a mistakenly placed O-ring and/or which enables an O-ring to be temporarily used to form a seal when the boss is badly damaged.

These and other objects and advantages of the present invention will become apparent after considering the following detailed specification which covers a preferred embodiment thereof in conjunction with the accompanying drawings wherein:

BRIEF DESCRIPTION OF THE DRAWINGS

FIG. 1 is a partially cutaway elevational view of a lip seal coupling constructed according to the prior art.

FIG. 2 is a partially cutaway elevational view of a lip seal coupling constructed according to the present invention.

FIG. 3 is an enlarged cross-sectional view of the portion of FIG. 2 lined by 3—3, showing some of the more important details thereof.

FIG. 4 is a partially cutaway view showing a method of manufacturing the coupling of FIG. 2;

FIG. 5 is a diagram showing the forces acting on the coupling of FIG. 2 when it is installed in a boss; and FIGS. 6A through 6F are side views of various fittings employing the concepts of the present invention.

DESCRIPTION OF THE SHOWN EMBODIMENTS

Referring to the drawings more particularly by reference numbers, number 10 in FIG. 1 refers to a prior art male lip seal coupling as disclosed in the above-referenced patent. The coupling 10 includes a threaded portion 12 at one end thereof which is adapted to threadably engage a female boss 14. The coupling 10 is tightened into the boss 14 by means of a wrench applied to the hexagonal central portion 16 thereof. When twisted, the threaded portion 12 draws the coupling 10 down into the boss 14, and the integrally formed lip seal element 18 of the coupling 10 is deformed against a chamfered seal 20 of the boss 14 which seals the coupling 10 to the boss 14. The deformation of the lip 18 is possible since the lip 18 is cantilevered and is relatively thin, thus making it relatively easy to deform against the boss seat 20. However, the tip 22 of the lip 18 must be relatively sharp because of the geometry of the lip. As shown, the sharp lip tip 22 tends to dig into or gouge the boss seat 20 and therefore fittings such as coupling 10 must be constructed from materials which are no harder than those materials from which the boss 14 is constructed. Also, such prior art fittings have no means to prevent overtightening except that under extreme circumstances it is possible to tighten the coupling 10 into the boss 14 so that the lip tip 22 contacts the lower portion of the fitting at its relatively small thread relief portion 24 thereof adjacent the threaded portion 12.

It should also be pointed out that the coupling 10 cannot be made of materials which rapidly work harden such as titanium alloy. This is because the lip 18, due to its extreme inward lean, requires a swaging step to form, which swaging step is virtually impossible when the coupling 10 is constructed from materials which rapidly work harden.

FIG. 2 shows a coupling 30 which employs the features of the present invention and is designed to replace the coupling 10 of FIG. 1. The coupling 30 includes a threaded portion 32 which is designed to extend down within a female boss 34 and to threadably engage therewith. The threaded portion 32 of the coupling 30 employs threads which are undersized, that is, they form a predetermined sloppy fit within the threads of the boss 34. The sloppy fit between the threaded portion 32 and the boss 34 enables the fitting 30 to self-center and adjust itself for maximum sealing contact as its sealing lip 36 is pulled down onto the boss seat 38 by torquing the coupling 30 at its hexagonal central portion 40.

Referring to FIG. 3 which is an enlargement of the encircled portion of FIG. 2, it can be clearly seen that the lip 36 of the present invention is substantially different in shape and in configuration than the lip 18 of the prior art coupling 10. For example, rather than sloping inward as does lip 18, lip 36 has an inner circumferential surface 42 which is substantially parallel to a spaced juxtaposed thread relief portion 44 and the axis 46 of the coupling 30. The shape of the surfaces 42 and 44 and the generally semi-circular surface 48 therebetween is important to the present invention since the disclosed configuration can be easily constructed using the robust L-shaped cutting tool 50 shown in FIG. 4 to cut the inner portions of the lip directly so that the lip 36 requires no swaging operation to form.

The outer surface 52 of the lip 36 is formed with a predetermined inward angle with respect to the inner surface 42 which angle is less than the complement of the boss seat angle shown as being the standard 30° angle. The surface 52 is faired into a generally semi-toroid lip tip surface 54, a portion of which becomes a contact ring 56 around the coupling 30 which forms the seal between the coupling 30 and the seat 38. It should be noted that the radii 58 of the lip tip surface 54 extend from a circle 59 positioned as shown and are large enough to be about half as long as the lip 36 itself. It is this relatively large radius lip tip surface 54 which in conjunction with the undersize thread portion 32, enables the coupling 30 to self-center itself on the boss seat 38. Also, the large radius lip tip surface 54 in combination with the robust lip 36 is able to provide sufficient force at the contact ring 56 to slightly plastically deform the seat 38 without biting or gouging it so that surface discontinuities and production tolerances can be overcome to provide an acceptable seal.

The fitting also includes an inner circumferential surface 62 which may define a passageway therethrough or in the case of a plug, a closed end cylinder. The thread relief surface 44 of the present coupling 30 is carefully designed in conjunction with the inner circumferential surface 62 to define a volume 64 which stretches and/or yields when predetermined forces are applied thereto, either by means of pressure applied within the coupling 30 or by tightening torque. The volume 64, which extends down the coupling 30 substantially further than the lip 36, is the stretch or yieldable thread relief portion 66 discussed above which is included to provide torque lock means, overtightening prevention means, and pressure relief means.

As can be seen with reference to FIG. 5, in reaction to the 30° seat 38, the tension T due to tightening torque produces a lip compression force $R_c$ equal to T and a lip deflection force $R_t$ of half that value. The outward reaction to the inward deflection of the cantilevered lip 36 and the stretching of the volume 64 causes the coupling 30 to lock up on the seat 38 when a predetermined tension T has been reached. The deformation of the lip 36 and the thread relief portion 66 of the coupling 30 also combine to provide a wide range of allowable tightening torques necessary to seal a variety of material combinations and at the same time, assure torque lock of the joint without resort to mechanical locking devices.

Under extreme pressure conditions the yieldable thread relief portion 66 also precludes rupture of the joint. The thread relief portion 66 is usually the weakest area of the coupling and therefore, extreme pressures, that is, burst pressures beyond the calculated yielding pressure, stretch the volume 64 allowing the lip 36 to lift off the seat 38 so that the coupling momentarily acts like a pressure poppet and thereby relieves the extreme pressure.

The open area 69 between the lip 36, the boss 34 and the thread relief portion 66 is sufficiently large to permit ingestion of an 0-ring mistakenly placed around the coupling 30 without affecting the sealing effectiveness of the lip 36. This is important since the prior art lip seal fittings have often been unable to cope with a misplaced 0-ring, a mistake which mechanics tend to habitually make. The area 69 also enables the intentional placement of one or more 0-rings therein as a temporary fix for a badly damaged and leaky boss seat 38.

The present invention can be embodied in many sizes and configurations. This is shown in Table 1 which shows the various dimensions labeled in FIG. 3 for lip seal couplings 30 of various sizes and FIGS. 6A through F. For example, in FIG. 6A a plug 70, employing the present invention, is shown installed in a boss 72, while FIG. 6B shows a similarly constructed reducer 74. The invention can also be applied to such means as the filter restrictor or relief valve 76 shown in FIG. 6C, the check valve 78 shown in FIG. 6D, or the quick disconnect 80 shown in FIG. 6E. Also, FIG. 6F shows various plugs 82, employing the present invention installed in a device 84 for modular equipment cartridges. It should be noted that although it is standard practice to safety wire plugs to assure they don't become loose, no safety wires are required for plugs constructed according to the present invention.

TABLE 1

| | Portsize | | | | | | |
|---|---|---|---|---|---|---|---|
| | −4 | −5 | −6 | −8 | −10 | −16 | −20 |
| Boss MS33649: | | | | | | | |
| A dia nom | .5695 | .6325 | .6955 | .8825 | 1.0075 | 1.4945 | 1.8075 |
| D dia nom | .4565 | .5195 | .5825 | .7715 | .8985 | 1.3385 | 1.6505 |
| Thread | 7/16-20 | 1/2-20 | 9/16-18 | 3/4-16 | 7/8-14 | 1 5/16-12 | 1 5/8-12 |
| Lip-seal fitting (refer to Fig. 3): | | | | | | | |
| B dia = $D_{boss}$ + K | .460 | .523 | .586 | .774 | .900 | 1.364 | 1.685 |
| K | .0035 | .0035 | .0035 | .0035 | .0015 | .0265 | .0345 |
| F dia | .529 | .592 | .655 | .843 | .969 | 1.433 | 1.738 |
| (F−B)/2 lip width | .0345 | .0345 | .0345 | .0345 | .0345 | .0345 | .0265 |
| Seal dia (F−.01836) | .5106 | .5736 | .6366 | .8246 | .9506 | 1.4146 | 1.7196 |
| Seal area, sq. in. | .2048 | .2584 | .3183 | .5340 | .7097 | 1.5717 | 2.3224 |
| Axial load (lb.) at 7,500 p.s.i. | 1,536 | 1,938 | 2,387 | 4,005 | 5,323 | 11,787 | 17,418 |
| Seal circum., in. | 1.604 | 1.802 | 2.000 | 2.591 | 2.986 | 4.444 | 5.402 |
| C dia (thread relief) | .361 | .423 | .478 | .657 | .770 | 1.192 | 1.503 |
| D dia (bore) | .187 | .234 | .297 | .422 | .500 | .875 | 1.093 |
| Stem area [π/4 (C² − D²)] | .0749 | .0975 | .1102 | .1992 | .2693 | .5146 | .8359 |
| Stem stress (p.s.i.) at 7,500 p.s.i. | 20,507 | 19,871 | 21,661 | 20,105 | 19,766 | 22,905 | 20,837 |
| ($A_{boss}$ − seal dia)/2 | .02945 | .02945 | .02945 | .02895 | .02845 | .03995 | .04395 |
| Contact below boss surface | .01700 | .01700 | .01700 | .01671 | .01642 | .02307 | .02537 |
| Total intrusion | .02600 | .02600 | .02600 | .02571 | .02542 | .03207 | .03237 |
| Axial force (b) calc. for f=0.1 | 3,200 | 3,973 | 4,208 | 7,571 | 7,471 | 8,264 | 7,361 |
| Lb./In. of seal circumference | 1,990 | 2,205 | 2,100 | 2,925 | 2,500 | 1,860 | 1,862 |

Thus there has been shown and described novel fittings of the lip seal type which fulfill all of the objects and advantages sought therefor. Many changes, modifications, variations and other uses and applications of the subject fittings will, however, become apparent to those skilled in the art after considering this specification together with the accompanying drawings. All such changes, modifications, variations and other uses and applications which do not depart from the spirit and scope of the present invention are deemed to be covered by the invention which is limited only by the claims which follow.

What is claimed is:

1. An assembly including a boss and a fitting for sealed attachment to said boss, said fitting being constructed from a relatively hard material with respect to the material from which said boss is constructed, said boss including a frustroconical seat for sealably mating with said fitting and an adjacent threaded portion for engaging said fitting, said fitting comprising:

a body portion constructed about an axis;

a threaded portion at a first end of said body portion adapted to engage with said boss;

a semi-flexible cantilevered lip extending toward said first end portion from said body portion, said lip having a lip tip including a lip tip surface for engagement with said boss to sealably mate therewith, said lip tip surface having a radius which is at least about half the length of said lip so that said lip tip is robust enough to plastically deform a portion of said boss, an inner circumferential surface substantially parallel to the axis of said fitting, and an outer circumferential surface which slopes inwardly toward said lip tip at an angle of less than 60° to said inner circumferential surface; and an elongated thread relief portion adjacent said threaded portion and spaced juxtaposed said lip, said thread relief portion being longer than said lip so when said fitting is installed in said boss, said thread relief portion extends from above said seat to the portion of said boss threaded portion in engagement with said fitting threaded portion, said body portion further including an inner circumferential surface of said body portion and said thread relief portion thereof define therebetween a weakened portion, said weakened portion acting as a torsion and tension spring to enable relief of pressures in excess of design pressures between said boss and said fitting and to assist in retaining said fitting in said boss.

* * * * *